United States Patent
Lydzinski et al.

(10) Patent No.: US 6,280,515 B1
(45) Date of Patent: *Aug. 28, 2001

(54) MODIFIED POLYSACCHARIDES FOR AQUEOUS FOAMABLE ADHESIVES

(75) Inventors: David W. Lydzinski, Belle Mead; Edmund W. Fig, Ringoes, both of NJ (US)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/603,155

(22) Filed: Jun. 23, 2000

(51) Int. Cl.$^7$ ...................................... C08H 7/28
(52) U.S. Cl. ................. 106/122; 106/215.2; 106/215.3; 106/215.4; 106/210; 521/84.1; 521/65

(58) Field of Search ........................... 521/84.1; 106/122, 106/215.2, 215.3, 215.4, 210

(56) References Cited

U.S. PATENT DOCUMENTS

| | | | | |
|---|---|---|---|---|
| 5,035,930 | * | 7/1991 | Lacourse et al. | 521/84.1 |
| 5,043,196 | * | 8/1991 | Lacourse et al. | 521/84.1 |
| 5,736,586 | * | 4/1998 | Bastioli et al. | 521/109.1 |
| 5,756,556 | * | 5/1998 | Tsai et al. | 521/84.1 |
| 5,801,207 | * | 9/1998 | Bastioli et al. | 521/54 |
| 5,922,379 | * | 7/1999 | Wang | 426/138 |

* cited by examiner

*Primary Examiner*—Morton Foelak
(74) *Attorney, Agent, or Firm*—Cynthia L. Foulke; Thomas F. Roland

(57) ABSTRACT

A process producing a foamed water-based adhesive is presented involving forming a foamable adhesive composition containing a polysaccharide modified with an alkyl succinic anhydride and then applying energy to said foamable adhesive composition to produce an adhesive foam.

14 Claims, No Drawings

MODIFIED POLYSACCHARIDES FOR AQUEOUS FOAMABLE ADHESIVES

FIELD OF THE INVENTION

This invention relates to foamable aqueous adhesives containing polysaccharides which have been modified with an alkyl succinic anhydride, and to the use of these foamed adhesives.

BACKGROUND OF THE INVENTION

Foamed adhesives show improved economics and performance over adhesives which are not foamed. Since foamed adhesives do not penetrate porous surfaces to the same extent as non-foamed adhesives, the open time increases and the tendency for pre-cure decreases. In addition, at any given film thickness, a foamed adhesive contains less water than an unfoamed adhesive. Less water in the adhesive leads to little or no grain raise, and improved non-curl. Foamed adhesives also have the ability to hold out on a substrate surface to a greater extent than unfoamed adhesives, resulting in less wasted adhesive.

Synthetic resin-based foamable adhesives are known in the art. U.S. Pat. No. 4,561,918 describes a foamed adhesive of an ethylene/vinyl acetate copolymer. U.S. Pat. No. 5,696,174 describes a method for producing a foam having increased stability, by using a composition having both a long-chain organic cation-forming compound, and a long-chain organic anion-forming compound. Foams produced from synthetic polymers and natural rubber emulsions are described.

Polysaccharides modified with alkyl succinic anhydrides are known. U.S. Pat. No. 2,661,349 describes octyloxy succinic anhydride modified polysaccharides for use in thickeners. U.S. Pat. No. 4,977,252 discloses modified starches useful in food and beverage applications.

JP 57143370 describes an aqueous adhesive in which air bubbles are mixed with a synthetic polymer or starch by mechanical stirring or chemical reaction. JP 62064877 describes a foamed aqueous adhesive having a foam stabilizer surfactant. The adhesive polymer is listed as either a water soluble resin (starch, cellulose derivatives, gelatin and polyvinyl alcohol) or a water dispersible synthetic resin. All of the examples are directed to synthetic resins.

While methods have been proposed for the foaming of both synthetic and natural polymer adhesives, success has been demonstrated only with synthetic polymers. Foamed polysaccharide-based adhesives tend to be unstable and dissipate within a few minutes. There has been a long-felt need to find a process for foaming a natural (polysaccharide-based) aqueous polymer adhesive which would provide a highly stable, consistent foam. The process of the present invention produces a highly stable and consistent aqueous foamed adhesive. The high stability and consistency of the foam allow its use in manufacturing applications requiring extended usage times. The foamable water-based adhesive produced by the process of the present invention offers a natural-based alternative to synthetic-based foamable adhesives currently on the market.

It has surprisingly been found that alkyl succinic anhydride groups act as foam generators. It has also been found that the use of such modified polysaccharides increases the level of foam in the foamable adhesives. Polysaccharides containing these groups can be used in place of conventional foam generators such as surfactants and soaps in an aqueous foamable adhesive composition, thus eliminating problems caused by surfactants and surfactant migration in the finished adhesive application.

SUMMARY OF THE INVENTION

Accordingly it is an object of the present invention to provide a process for producing a stable, consistent aqueous polysaccharide-based foamed adhesive, using a polysaccharide modified with an alkyl succinic anhydride. Specifically, the invention provides a process comprising:
a) combining:
   1) a polysaccharide modified with an alkyl succinic anhydride; and
   2) water to produce a foamable adhesive composition; and
b) applying energy to said foamable adhesive composition to produce an adhesive foam.

Another object of the invention is a foamed adhesive which is produced by the process described above.

DETAILED DESCRIPTION OF THE INVENTION

The process of the present invention involves applying energy to a foamable, polysaccharide-based adhesive composition which is the combination of a polysaccharide modified with an alkyl succinic anhydride and water, to produce a foamed adhesive.

Polysaccharides which can be modified for use in the present invention include starch, dextrin, cellulose, gums and combinations thereof. Particularly useful are the starches and dextrins including, native, converted or derivatized. Such starches include those derived from any plant source including corn, potato, wheat, rice, sago, tapioca, waxy maize, sorghum and high amylose starch such as high amylose corn, i.e., starch having at least 45% amylose content by weight. Starch flours may also be used. Also included are the conversion products derived from any of the former bases, such as, for example, dextrins prepared by hydrolytic action of acid and/or heat; fluidity or thin boiling starches prepared by enzyme conversion or mild acid hydrolysis; oxidized starches prepared by treatment with oxidants such as sodium hypochlorite; and derivatized or modified starches such as cationic, anionic, amphoteric, non-ionic, crosslinked and hydroxypropyl starches. Other useful polysaccharides are cellulose materials such as carboxymethylcellulose, hydroxypropyl cellulose and hydroxypropyl methylcellulose, and gums such as guar, xanthan, pectin and carrageenan.

The modified polysaccharides are present in the foamable adhesive composition at from 0.1 to 80 percent by weight, based on the foamable adhesive composition as a whole. A preferred concentration for the modified polysaccharides is from 0.5 to 40 percent by weight, based on the foamable adhesive composition as a whole.

Polysaccharides modified with an alkyl succinic anhydride are known and can be synthesized by means known in the art. Modified polysaccharides include, but are not limited to, octenyl succinic anhydride (OSA) and dodecenyl succinic anhydride (DDSA) modified starches or dextrins. A preferred level of substitution on a polysaccharide is from 0.5 to 5 percent by weight, based on the modified polysaccharide. Another preferred level is below 3 percent by weight.

The foamable adhesive composition contains from 10 to 97 percent by weight of water, preferably from 30 to 80 percent by weight.

Optionally, unmodified polysaccharides may be included in the foamable adhesive composition.

Other additives typical of adhesive compositions can be added to the foamable adhesive composition. Said additives include, but are not limited to, fillers, surfactants, plasticizers, polyvinyl alcohol, humectants, stabilizers, rheology modifiers, synthetic resins, tackifiers, defoamers, preservatives, acids, waxes and catalysts and other additives commonly used in the art.

While the polysaccharide modified with a alkyl succinic anhydride can replace surfactants as foam generators, and preferably the foamable adhesive composition is free of any surfactant, surfactants may be used in the process of the present invention. Surfactants include anionic, cationic, amphoteric and non-ionic surfactants known in the art.

Humectants for use in the present invention include, but are not limited to, calcium chloride, diethylene glycol, glycerin, hexylene glycol, propylene glycol, magnesium chloride, sodium nitrate, sorbitol, corn syrup, sucrose and urea. Humectants are used at levels up to 60 percent by weight, based on the adhesive composition, preferably at level of 5 to 35 percent by weight.

The foamable adhesive composition, prior to foaming, preferably has a viscosity at 25° C. of from 10 to 300,000 cps, and most preferably 100 to 5,000 cps.

The foamable adhesive composition of the invention is foamed by the addition of energy by means known in the art, such as, but not limited to, by mechanical and/or chemical means. Air or other gases are added to the foamable adhesive composition along with the addition of energy to produce a stable, consistent foamed adhesive. Foams formed by the inclusion of air are preferred. The adhesive foam may be produced by mechanical means such as mechanical stirring or agitation, introduction of gases or by chemical means.

The adhesive produced by the process of the present invention is useful in paper laminating, tube/corewinding, wood bonding, tissue and towel manufacture, coreless tube manufacture, personal care applications, polyolefin bonding, bag and sack manufacturing, bookbinding, cigarette making, bottle labeling, surface coatings and other adhesive applications.

The invention can be illustrated by the following non-limiting example.

EXAMPLE

This example demonstrates the foaming advantage of the present invention, over a process using a composition without a modified polysaccharide. All percentages given are in weight percent. The modified tapioca dextrin was modified with 3 percent by weight of octyl succinic anhydride, based on the weight of the dextrin.

|  | A(comp) | B | C |
|---|---|---|---|
| Water (tap) | 67 | 67 | 67 |
| Tapioca dextrin | 33 | — | 28 |
| Modified tapioca dextrin | — | 33 | 5 |

The polysaccharide and water were combined. The samples were stirred for 1 hour and then tested for foamability as described below.

100 ml of each composition was placed in a 1 liter graduated cylinder. The viscosity of each composition was measured and recorded. A gas dispersion tube was connected to an air supply and inserted into the composition. Air was bubbled though the composition at 2 psi for 30 seconds. The air was shut off. After 10 seconds, the foam height in the graduated cylinder was recorded.

Foam percentage is calculated by the difference in height between the foamed sample and unfoamed sample. As shown in the following table, samples B and C of the present invention show increased foamability over a control sample A.

|  | A(comp) | B | C |
|---|---|---|---|
| Solids, wt % | 33 | 33 | 33 |
| Viscosity, cps | 250 | 300 | 250 |
| Foam, cc | 100 | 220 | 130 |
| % foam | 10 | 120 | 30 |

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A process for producing a foamed water-based adhesive comprising:
   a) forming a foamable adhesive composition comprising:
      1) a polysaccharide modified with an alkyl succinic anhydride; and
      2) water,
      wherein said foamable adhesive composition has a viscosity of from 10 to 300,000 cps at 25° C., and
   b) applying energy to said foamable adhesive composition to produce a foamed adhesive.

2. The process of claim 1 wherein the modified polysaccharide comprises a starch, dextrin, cellulose, guar gum or combination thereof.

3. The process of claim 1 wherein said alkyl succinic anhydride comprises octenyl succinic anhydride, dodecenyl succinic anhydride, or mixtures thereof.

4. The process of claim 1 wherein said foamable adhesive composition comprises from 0.1 to 80 percent by weight of said modified polysaccharide.

5. The process of claim 4 wherein said foamable adhesive composition comprises from 0.5 to 40 percent by weight of said modified polysaccharide.

6. The process of claim 1 wherein said polysaccharide is modified with from 0.5 to 5 percent by weight of alkyl succinic anhydride.

7. The process of claim 1 wherein said polysaccharide is modified with up to 3 percent by weight of alkyl succinic anhydride.

8. The process of claim 1 wherein said foamable adhesive composition comprises 10 to 97 percent by weight of water.

9. The process of claim 5 wherein said foamable adhesive composition comprises 30 to 80 percent by weight of water.

10. The process of claim 1 further comprising at least one unmodified polysaccharide.

11. The process of claim 1 wherein said foamable adhesive composition further comprises an additive.

12. The process of claim 11 wherein said additive is selected from the group consisting of surfactants, fillers, plasticizers, acids, waxes, catalysts, humectants, stabilizers, rheology modifers, synthetic resins, polyvinyl alcohol, tackifiers, defoamers, preservatives, and mixtures thereof.

13. The process of claim 1 wherein said energy is applied in the form of mechanical energy.

14. A foamed adhesive formed by the process of claim 1.

* * * * *

UNITED STATES PATENT AND TRADEMARK OFFICE
CERTIFICATE OF CORRECTION

PATENT NO. : 6,280,515 B1
DATED : August 28, 2001
INVENTOR(S) : David W. Lydzinski et al.

It is certified that error appears in the above-identified patent and that said Letters Patent is hereby corrected as shown below:

<u>Title page,</u>
Item [75] Inventor, should read -- Edmund W. Figiel --.

Signed and Sealed this

Eighteenth Day of December, 2001

Attest:

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.         : 6,280,515 B1  
APPLICATION NO. : 09/603155  
DATED                   : August 28, 2001  
INVENTOR(S)        : David W. Lydzinski et al.

It is certified that error appears in the above-identified patent and that said Letters Patent is hereby corrected as shown below:

Title page,
Item [75] Inventors, should read

-- David W. Lydzinski, Belle Mead, NJ (US)
   Edmund W. Figiel, Ringoes, NJ (US) --

This certificate supersedes the Certificate of Correction issued December 18, 2001.

Signed and Sealed this

Twelfth Day of August, 2008

JON W. DUDAS
*Director of the United States Patent and Trademark Office*